Jan. 24, 1956 U. M. JONES 2,732,144

AUTOMATIC TAPE PLAYER

Filed Sept. 4, 1953 4 Sheets-Sheet 1

INVENTOR.

ULISSES M. JONES

BY

McMorrow, Berman + Davidson

ATTORNEYS

Jan. 24, 1956 U. M. JONES 2,732,144

AUTOMATIC TAPE PLAYER

Filed Sept. 4, 1953 4 Sheets-Sheet 2

INVENTOR.
ULISSES M. JONES
BY
McMorrow, Berman + Davidson
ATTORNEYS

Jan. 24, 1956 U. M. JONES 2,732,144

AUTOMATIC TAPE PLAYER

Filed Sept. 4, 1953 4 Sheets-Sheet 3

INVENTOR.
ULISSES M. JONES

BY

McMorrow, Berman & Davidson

ATTORNEYS

Jan. 24, 1956 U. M. JONES 2,732,144

AUTOMATIC TAPE PLAYER

Filed Sept. 4, 1953 4 Sheets-Sheet 4

INVENTOR.
ULISSES M. JONES

BY

McMorrow, Berman & Davidson
ATTORNEYS

United States Patent Office 2,732,144 Patented Jan. 24, 1956

2,732,144

AUTOMATIC TAPE PLAYER

Ulisses M. Jones, Huntington, W. Va.

Application September 4, 1953, Serial No. 378,612

11 Claims. (Cl. 242—55)

This invention relates to tape transport mechanisms, and more particularly to an improved magnetic tape reproducing mechanism.

A main object of the invention is to provide a novel and improved playing mechanism for magnetic tape which is relatively simple in construction, which is self-reversing when the end of a tape is approached, and which is self-regulating in speed.

A further object of the invention is to provide an improved magnetic tape player which involves relatively inexpensive components, which is rugged in construction, which is self-reversing so that the direction of movement of a magnetic tape on the player is reversed when the end of the tape is approached, and which simultaneously shifts the position of the magnetic pickup head as the direction of the tape is reversed so that the pickup head is disposed to pick up the magnetic recording on either the top half or the bottom half of the tape, in accordance with the direction of movement of the tape.

A still further object of the invention is to provide an improved tape transport mechanism which is battery operated and which is self-regulating in speed, the improved mechanism being suitable for use on a motor vehicle and to employ the audio amplifier of the radio of the vehicle, as well as the speaker associated with the vehicle radio, the improved mechanism being provided with means to hold the voltage applied to its driving motor substantially constant and to provide continuous playing of a tape mounted on the mechanism by automatically reversing the direction of tape movement when the end of the tape is approached.

Further objects and advantages of the invention will become apparent from the following description and claims, and from the accompanying drawings, wherein:

Figure 6:
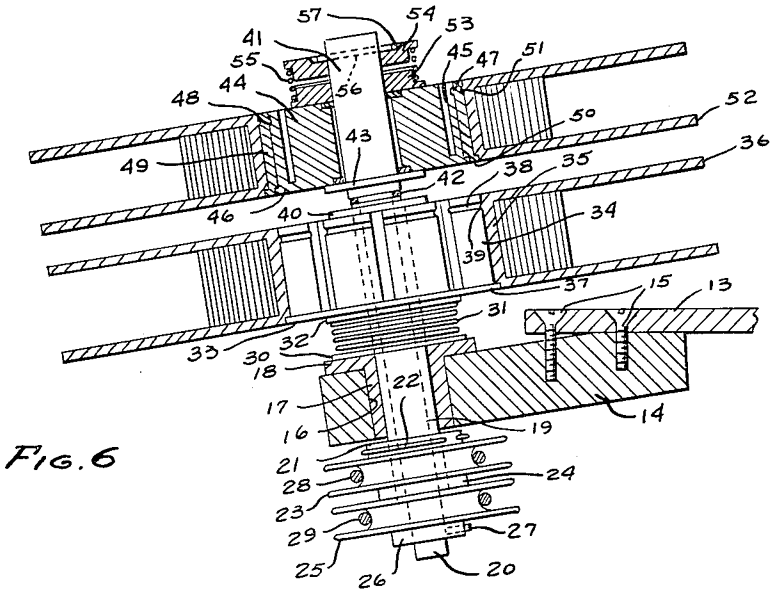
Figure 6 is a vertical cross-sectional view taken on the line 6—6 of Figure 2.

Referring to the drawings, the tape transport mechanism is designated generally at 11 and comprises a main supporting plate 12 formed with the forwardly extending arm portion 13. Secured to the under side of the end of arm portion 13, as shown in Figure 6, is the forwardly and downwardly inclined block member 14, said block member being fastened to the arm 13 in any suitable manner, as by the supporting screws 15, 15, shown in Figure 6. The block member 14 is formed with an aperture 16 in which is secured the annular bearing bushing 17 having a top flange 18. Rotatably positioned in the bushing 17 is the spindle sleeve 19 through which extends a shaft 20. Detachably secured to the spindle sleeve 19 below the bushing 17 and surrounding said spindle sleeve is the bearing collar 21, said collar being locked to the spindle sleeve 19 by a circular spring member 22 having a radial detent element extending through the collar 21 and into a recess in the spindle sleeve 19, whereby the thrust bearing collar 21 is detachably secured to the sleeve. Mounted on the spindle sleeve subjacent the collar 21 is a first pulley 23 which is supported on an annular bearing collar 24 engaged on the bottom end portion of the sleeve 19. Disposed on the shaft 20 below the collar 24 is a second pulley 25 which is supported on a collar 26 surrounding the shaft 20 and secured thereto by a set screw 27. The pulleys 23 and 25 are formed with peripheral belt-receiving grooves of substantial depth to allow for a considerable amount of sag in their respective belts, shown at 28 and 29 without permitting the belts to become disengaged from the pulleys. The pulleys are secured to the sleeve 19 and shaft 20 with sufficient tightness to provide driving connections of the pulleys to said sleeve and shaft.

Secured on the sleeve 19 above the flange 18 of bushing 17 with a tight fit is a washer 30. Surrounding the sleeve above the washer 30 is a coiled spring 31, and loosely engaged on the sleeve above the spring is a second washer 32. The washers 30 and 32 are of special construction, having inner portions received in the spring 31, and having flange portions bearing on the opposite end coils of said spring. The washers 30 and 32 are similar in construction to the washers 53 and 54 shown in Figure 6. Engaged on the sleeve 19 above the washer 32 is the reel hub 33, said hub comprising an annular body formed with the flexible peripheral finger elements 34 for receiving the hub engaging cylindrical portion 35 of a reel 36. As shown in Figure 6, the hub 33 is formed with a peripheral bottom flange 37 and the fingers 34 are formed with recesses 38 near their top portions. The cylindrical hub-engaging portion 35 of the reel 36 is formed with a recess at its lower rim engaging on the flange 37, and said portion 35 is formed with an inwardly projecting rib 39 lockingly engageable with the recesses 38 of the resilient fingers 34 of the reel-carrying hub 33.

Engaging the top portion of the sleeve 19 over hub 33 is a retaining washer 40. Secured on the shaft 20 above the washer 40 is a second spindle sleeve 41 which is supported on a thrust washer 42 surrounding the shaft and bearing on the top end of the sleeve 19.

The washer 40 is employed to retain the reel-carrying hub 33 on the sleeve 19 and may be of a conventional type engaging in a groove provided in the top portion of sleeve 19. For example, the washer 40 may be of U-shape so that it may be slipped over the hub 33 into engagement with the groove provided in the sleeve 19. Designated at 43 is a similar retaining washer which is secured to the lower portion of the sleeve 41 and which supports a second hub-carrying member 44 disposed on the sleeve 41. The hub-carrying member 44 is substantially smaller in diameter than the hub-carrying member 33 and is similarly formed with the resilient peripheral fingers 45 and with a bottom flange 46. The fingers 45 are recessed at 47 to lockingly receive inwardly projecting rib elements 48 of a split adapter ring 49 normally having the same outside diameter as the first hub-carrying member 33. The adapter ring 49 is formed with the bottom flange 50 and with the detent receiving recesses 51 to lockingly and supportingly engage a second reel 52 identical to the reel 36. Ring 49 is yieldable inwardly to allow reel 52 to be engaged thereon. Loosely engaged on the sleeve member 41 above the hub-carrying member 44 are the washers 53 and 54, similar in construction to the washers 30 and 32, which are biased apart by a coiled spring 55 bearing between respective flanges provided respectively at the bottom end of the washer 53 and at the top end of the washer 54, as shown in Figure 6. The spring 31 employed with the washers 30 and 32 engages respective flanges on the washers 30 and 32 in a similar manner.

Sleeve 41 is rigidly secured on the top end portion of shaft 20, as by a press fit or the like. A transverse pin 56 extends through sleeve 41 and shaft 20 and has its end portions received in keyways 57 formed in washer 54, acting to drive washer 54 as well as to oppose the upward thrust of spring 55.

From the above description it will be seen that the reels 52 and 36 may be readily removed from their hub-supporting members 44 and 33 when desired, and may be readily replaced thereon. To remove the reels, the reel 52 is first lifted off the adapter ring 49. The adapter ring 49 is then lifted off the reel-supporting hub member 44, thereby providing sufficient clearance to permit the removal of the reel 36. The reels may be replaced by following a reverse procedure.

Figure 3:
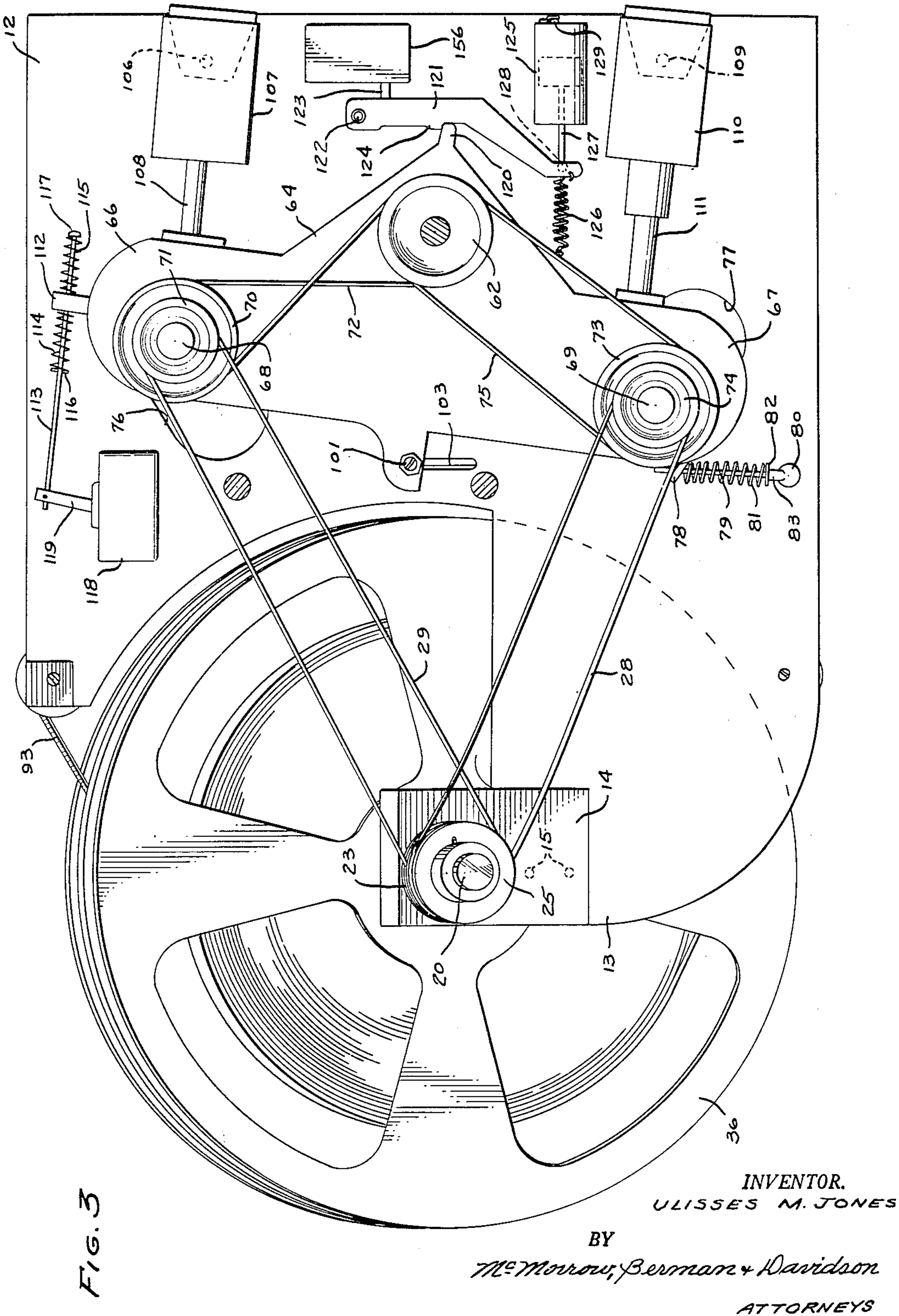
Figure 3 is a horizontal cross-sectional view taken on the line 3—3 of Figure 2.

Secured to the bottom of the main supporting plate 12 is an electric motor 60 having the vertical shaft 61 on which are secured the respective drive pulleys 62 and 63. Designated at 64 is an auxiliary supporting plate which is pivoted to the main supporting plate 12 for rotation adjacent the bottom surface of said main supporting plate, the pivotal connection of auxiliary plate 64 to main plate 12 being shown at 65 and being in alignment with the axis of the motor shaft 61. As shown in Figure 3, the auxiliary plate 64 is generally triangular in shape and is formed with the respective opposite wing elements 66 and 67. Journaled in the wing element 66 is a vertical shaft 68 and journaled in the wing element 67 is a vertical shaft 69. The shaft 68 has secured to its lower portion the respective pulleys 70 and 71. Pulley 70 is drivingly coupled to the motor pulley 62 by a crossed belt 72 and the pulley 71 is drivingly coupled to the spindle pulley 23 by the belt 28. Secured on the shaft 69 below the auxiliary plate 64 are the respective pulleys 73 and 74, the pulley 73 being drivingly coupled to the motor pulley 63 by a belt 75 and the pulley 74 being drivingly coupled to the spindle pulley 25 by the belt 29. The auxiliary plate 64 is rotatable between two predetermined positions, the shafts 68 and 69 extending through respective arcuate slots 76 and 77 provided in the main supporting plate 12 through which said shafts may be moved. The wing element 67 is formed with a lug 78 through which slidably extends the end portion of a pin member 79 pivoted at 80 to the main plate member 12 and which carries the toggle spring 81 engaging between the lug 78 and a washer 82 provided adjacent the pivotal connection 80 and bearing on a shoulder element 83 on the pin member. The spring 79 thus serves to bias the auxiliary plate member 64 toward either of its two predetermined rotated positions and provides a toggle action causing the plate member 64 to be rotated towards its second position after it has been moved past a dead center position of the toggle element from a first position.

Figure 1:
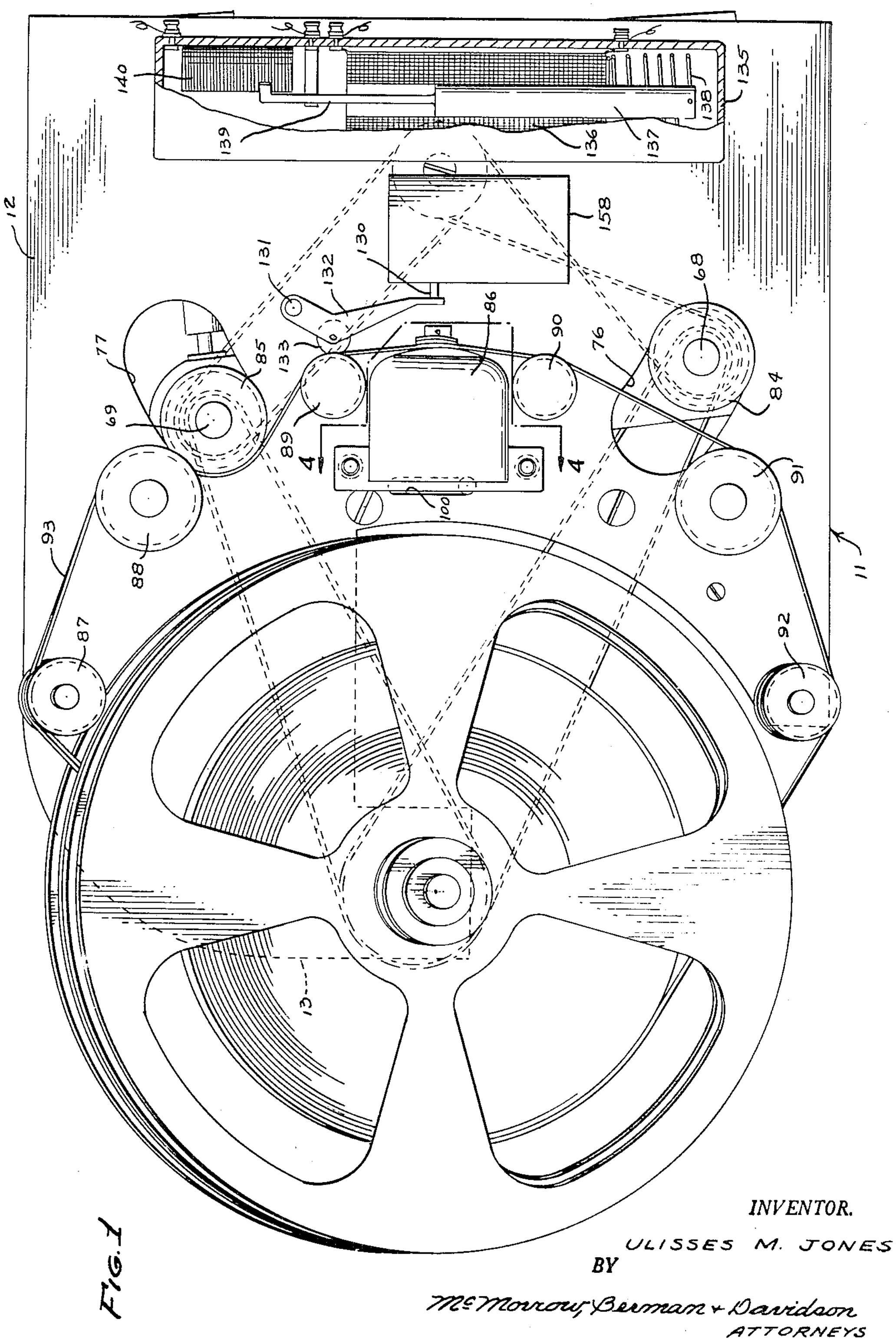
Figure 1 is a top plan view, partly in cross section, of an improved tape transport mechanism constructed in accordance with the present invention.

Secured on the shaft 68 above the main supporting plate 12 is a first capstan member 84 and secured on the shaft 69 above the main plate 12 is a second capstan member 85. Designated at 86 is the magnetic transducer head which is supported on the plate member 12 between the capstan members 85 and 84 in a manner presently to be described. Journaled on the plate member 12 are the respective guide rollers 87, 88, 89, 90, 91 and 92 which guide the tape, shown at 93, past the pickup gap of the transducer head 86 and past the respective capstan members 85 and 84, as shown in Figure 1.

Figures 2, 4, 5:
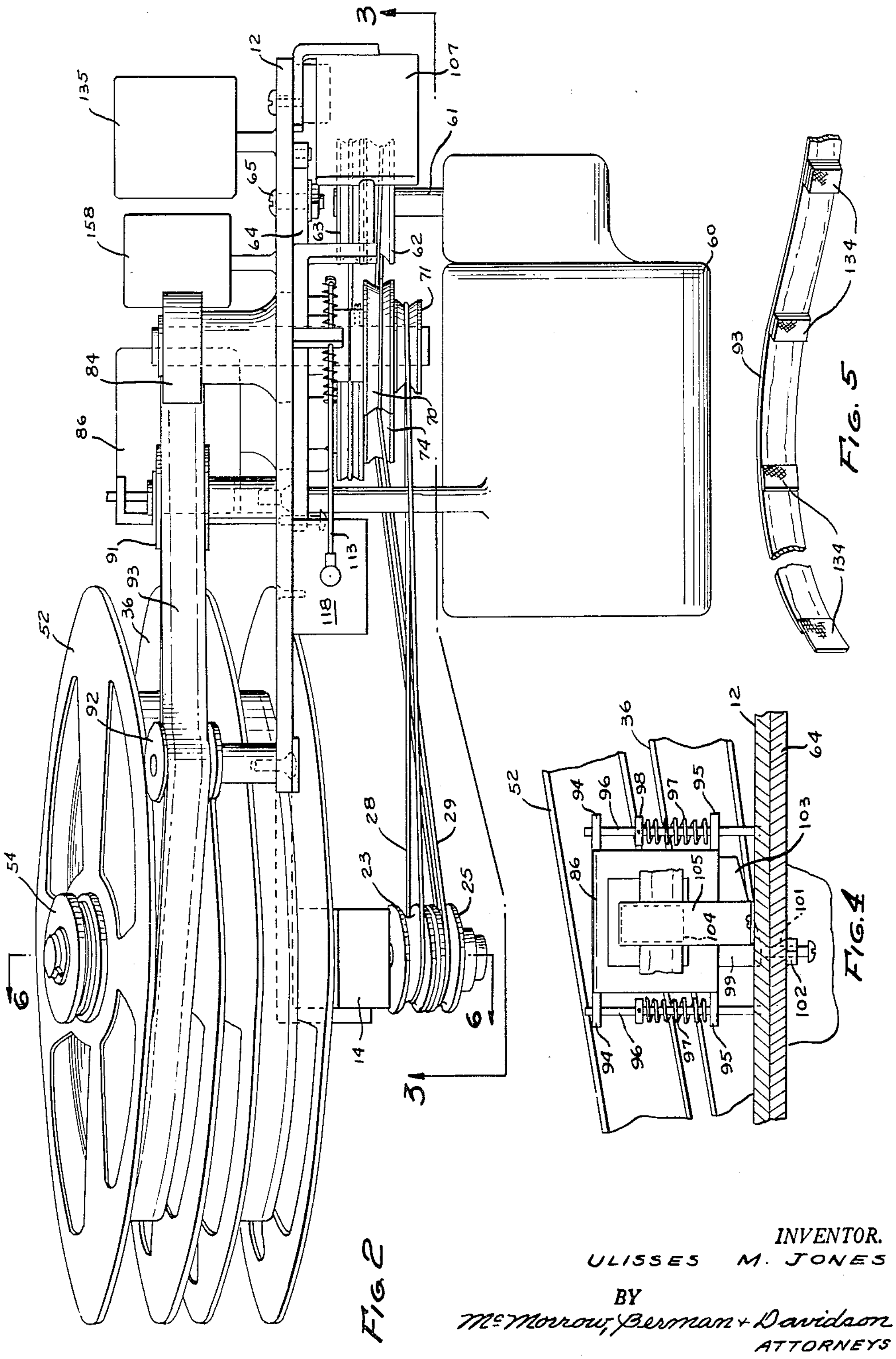
Figure 2 is a side elevational view of the tape transport mechanism shown in Figure 1.
Figure 4 is a vertical cross-sectional detail view taken on the line 4—4 of Figure 1 and showing details of the tape pickup head.
Figure 5 is a fragmentary perspective view of an end portion of a magnetic tape adapted to be employed on the tape transport mechanism of Figures 1 to 4.

The pickup head 86 has respective laterally projecting top and bottom flanges 94 and 95 slidably receiving vertical pins 96 secured to the main plate 12. Coiled springs 97 surround the pins 96 and bear between the bottom flanges 95 and washers 98 secured on the pins to bias the head 86 downwardly. The head 86 is provided with a depending cam lug 99 which extends through a slot 100 provided in the main plate 12 and which abuts a stop screw 101 threadedly engaging through the auxiliary plate member 64 and locked in adjusted position by a lock nut 102. As shown in Figure 4, the cam lug 99 has an inclined bottom edge 103, whereby the head 86 is moved vertically responsive to the rotation of the auxiliary plate member 64. Thus, the head 86 may be arranged in a first position to pick up the magnetized lower track of the magnetic tape 93, whereas in its other position it will be located to pick up the magnetized upper track of the tape. Designated at 105 is a leaf spring of non-magnetic material which is secured to the main plate 12 and which is arranged opposite the gap element of the pickup head 86. The spring 105 is provided with a pad element 104 which engages the backside of the tape 93 and exerts gentle pressure on the tape to hold the tape closely adjacent to the gap of the pickup head as the tape travels past said gap.

Pivoted to the main plate 12 at 106 is a first solenoid 107 provided with a plunger 108 connected to the wing portion 66 of the auxiliary plate member 64, as shown in Figure 3. Pivoted to the main plate 12 at 109 is a second solenoid 110 having the plunger 111 connected to the wing portion 67 of the auxiliary plate 64. Energization of the solenoid 110 will rotate the auxiliary plate 64 counterclockwise from the position thereof shown in Figure 3, and conversely, energization of the solenoid 107 will rotate the plate member 64 back to the full line position thereof shown in Figure 3.

Rigidly secured to the end of the wing element 66 is an apertured lug 112 through which slidably extends a rod member 113, the rod member being resiliently connected to the lug 112 by the provision of respective coil springs 114 and 115 on the rod member on opposite sides of the lug 112, the springs bearing respectively on a collar element 116 secured on the shaft element 113 and an abutment head 117 secured on the end of the shaft element 113. Designated at 118 is a double-pole, double-throw reversing switch which is secured to the main plate 12 and which has the operating lever 119. The lever 119 is pivotally connected to the shaft element 113, whereby the switch 118 is reversed responsive to the rotation of the auxiliary plate member 64 from one position thereof to the other, as above described. The apex portion of the auxiliary plate member 64 is formed with a lug 120 which is cammingly engageable with an arm 121 pivoted at 122 to the main plate 12. Secured to the main plate adjacent the arm 121 is the normally closed micro-switch 156 having the actuating element 123 which opens the switch 156 when the arm 121 is swung counterclockwise, as viewed in Figure 3. Thus, micro-switch 156 will be opened when the actuating element 123 is pushed inwardly and will close when said actuating element is released. The arm 121 is formed with the cam projection 124 over which the lug 120 passes when the auxiliary plate member 64 is swung from one of its positions to the other. When the lug 120 engages the projection 124, the arm 121 is swung counterclockwise, as viewed in Figure 3, to open the switch 156. After the lug 120 has completely passed the projection 124, the arm 121 is released and is urged clockwise, as viewed in Figure 3, by a coiled spring 126 connected between the free end of the arm and the plate member 12, as is clearly shown in Figure 3. However, the return of the arm 121 to its normal position is made slow-acting by the provision of a dashpot 125 secured to the under side of the plate member 12, said dashpot having the plunger 127 which is pivotally connected at 128 to the free end portion of arm 121. The dashpot 125 is provided with suitable valve means 129 allowing air to be expelled from the dashpot when the arm 121 is swung counterclockwise and introducing a substantial time delay of the order of five seconds for the reentry of air into the dashpot after arm 121 has been released and is being urged toward its normal position, such as that shown in Figure 3, by the action of the spring 126. Thus, after the switch 156 has been opened, the reclosure thereof responsive to the release of the arm 121 is delayed for a predetermined period, for example, a period of the order of five seconds.

Secured on the top of the plate 12 adjacent to and spaced slightly from the head 86 is a normally open micro-switch 158 having the actuating element 130 which closes the switch responsive to the inward movement thereof. Pivoted to the main plate 12 at 131 is an arm 132 provided with a roller 133 disposed adjacent to the guide roller 89, the tape 93 passing between the guide roller 89 and the roller 133, as shown in Figure 1. The free end portion of the arm 132 is in engagement with the end of the actuating member 130, whereby the actuating member 130 is pushed inwardly to close the switch 158 responsive to counterclockwise rotation of arm 132, as viewed in Figure 1.

The portions of the tape 93 adjacent its ends are provided with spaced abutment elements 134 which may comprise small pieces of adhesive tape secured to the inside surfaces of the magnetic tape 93 at spaced intervals thereon, as shown in Figure 5. The abutment elements 134 are of substantial thickness, and when said abutment elements pass between the rollers 89 and 133, the arm 132 is swung counterclockwise, as viewed in Figure 1, to thereby momentarily close the micro-switch 158. In normal playing position, the tape 93 passes between guide roller 89 and roller 133 and does not touch roller 133. Roller 133 is engaged by the abutment elements 134 only during the change cycle of operation of the device.

Figure 7:
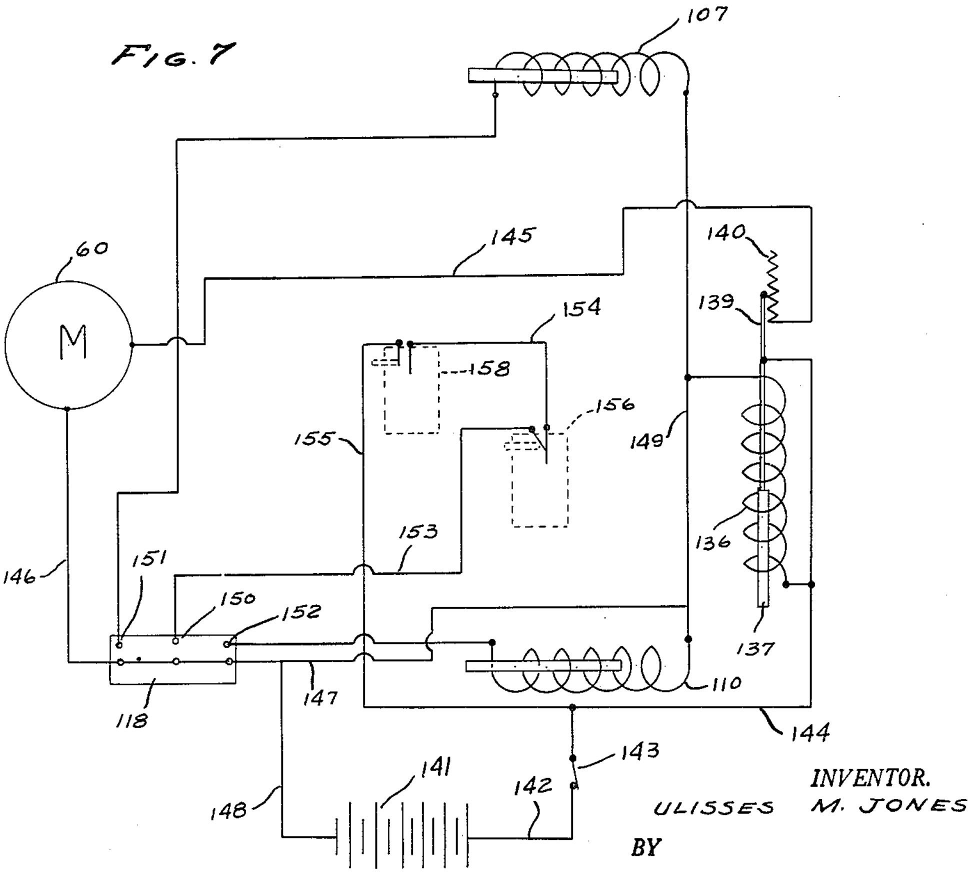
Figure 7 is an electrical wiring diagram showing the connections of the various elements of the tape transport mechanism shown in Figures 1 to 3.

Mounted on the main plate 12 is a solenoid housing 135 containing the solenoid 136 having a plunger 137 which is biased toward one end wall of the housing 135 by a coiled spring 138 acting between the plunger and the end of the solenoid. Secured to the opposite end of the plunger is a contact arm 139 engaging a wire wound resistance 140, whereby the rod 139 and resistance 140 comprise a rheostat. As shown in Figure 7, this rheostat consisting of the contact arm 139 and the resistor 140 is connected in series with the motor 160 and the current source, by a circuit comprising the battery 141, a wire 142 including a control switch 143, a wire 144, the contact arm 139, the rheostat 140, a wire 145, the motor 60, a wire 146, one side of the double pole, double-throw reversing switch 118, a wire 147 and the return wire 148. The solenoid 136 is connected between the wire 144 and a wire 149 which is connected to the wire 147, whereby the solenoid 136 is connected across the battery 141 and whereby the energization of said solenoid will depend upon the battery voltage. Hence, fluctuations of battery voltage will cause the plunger 137 to be moved in accordance with said fluctuations, and will thereby cause the contact arm 139 to be moved on the rheostat 140, varying the resistance in series with the motor 60, and thereby changing the speed of the motor in accordance with the fluctuations of battery voltage. Thus, the speed of the motor is made substantially constant, since the changes in resistance of the rheostat comprising the arm 139 and the resistor 140 are designed to compensate for such fluctuations in battery voltage, to thereby maintain the speed of the motor substantially constant.

As above mentioned, the switch 118 is of the double pole, double-throw type and one side thereof connects the wire 146 to the wire 147 at all times, regardless of the position of the switch. The pole element of the other side of the switch, designated at 150 is adapted to engage either the stationary contact 151 or the stationary contact 152 of the switch, in accordance with the rotated position assumed by the auxiliary plate member 64. As shown in Figure 7, the first solenoid 107 is connected between the wire 149 and the stationary contact 151 and the second solenoid 110 is connected between the wire 149 and the stationary contact 152. The pole element 150 is connected by a wire 153 to one terminal of the normally closed micro-switch 156. The other terminal of the micro-switch 156 is connected by a wire 154 to one terminal of the normally open micro-switch 158. The remaining terminal of the normally open micro-switch 158 is connected by a wire 155 to the wire 144. Thus, with the parts arranged as shown in Figures 1, 2 and 3, the solenoid 110 will be energized momentarily when the micro-switch 158 is momentarily closed by the engagement of an abutment element 134 between the rollers 89 and 133 to cause the plate member 64 to be swung counterclockwise from the position thereof shown in Figure 3 to a second position.

In operation of the device, when the end of the tape is approached, a first abutment element 134 passes between the rollers 89 and 133 and swings the arm 132 counterclockwise, as viewed in Figure 1, to momentarily close the micro-switch 158. This rotates the plate member 64 from its previous position, wherein the capstan 85 disengages the tape, to a new position wherein the capstan 84 engages the tape, thereby reversing the direction of movement of the tape. It will be understood that the closure of the switch 158 momentarily energizes the solenoid 110 to cause the plate member 64 to be thus rotated. It will be further understood that the reels 36 and 52 are reversed in direction since the tension on the belt 29 is now removed and the tension on the belt 28 is now increased sufficiently to cause the belt 28 to drive its pulley 23. The reels are thus driven in the same direction as the driving direction of capstan 84, whereby reversal of the direction of movement of the tape takes place in a smooth and rapid manner. Simultaneously with the rotation of the plate member 64, the pickup head 86 is shifted vertically, as above described, to position its pickup gap opposite the proper track on the magnetic tape.

The rotation of the auxiliary plate member 64 also causes the micro-switch 156 to be opened and to be held opened for a predetermined time period, by the action of the dashpot 125 in retarding the return of the arm 121, whereby further reversal of the tape movement will not immediately occur as additional abutment elements 134 pass between the rollers 89 and 133 after a first reversal has been accomplished. Thus, a sufficient time is provided after the reversal of direction of the tape has occurred to allow the abutment elements 134 to clear the rollers 89 and 133 in their return movement so that undesired energization of the solenoid 107 will not occur during this period.

After the time period established by the dashpot 125 and its associated valve structure 129 has elapsed, whereby the arm 121 is returned to its normal position, and whereby the switch 156 is closed, the apparatus is reset for reversal when the opposite end of the tape is approached. Therefore, after the device has been once set in operation, it will continue to operate continuously, shifting from one track of the dual-track tape to the other and reversing its direction, as above described, providing uninterrupted playback of the magnetic tape until the main control switch 143 is opened.

While the above apparatus has been described for use as a playback mechanism, it will be readily understood that it may also be employed for recording by merely providing proper input for the transducer head 86. It will be further understood that the mechanism above described is adapted to be employed with the usual amplifier and speaker, such as the amplifier and speaker of an automobile radio.

While a specific embodiment of an improved tape transport mechanism has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a tape transport mechanism of the type including a support, a pair of reels journaled on said support and arranged to receive the opposite end portions of a magnetic tape wound thereon, and a magnetic transducer head, the improvement comprising a plate member pivoted to said support, a pair of drive capstans journaled on said plate member, guide means for supporting a magnetic tape wound on said reels adjacent said transducer head and adjacent said drive capstans, means driving said capstans in opposite directions of rotation, a first electromagnetic device connected to said plate member and arranged to rotate the plate member to bring one of the capstans against the tape responsive to energization of the first electromagnetic device, and a second electromagnetic device connected to said plate member and arranged to rotate the plate member in an opposite direction to bring the other drive capstan against the tape responsive to energization of said second electromagnetic device.

2. In a tape transport mechanism of the type including a support, a pair of reels journaled on said support and arranged to receive the opposite end portions of a magnetic tape wound thereon, and a magnetic transducer head, the improvement comprising a plate member pivoted to said support, a pair of drive capstans journaled on said plate member, guide means for supporting a magnetic tape wound on said reels adjacent said transducer head and adjacent said drive capstans, means driving said capstans in opposite directions of rotation, a first electromagnetic drive connected to said plate member and arranged to rotate the plate member to bring one of the capstans against the tape responsive to energization of the first electromagnetic device, a second electromagnetic device connected to said plate member and arranged to rotate the plate member in an opposite direction to bring the other drive capstan against the tape responsive to energization of said second electromagnetic device, a source of current, a reversing switch connected between said source and the respective electromagnetic devices, and means for operating said reversing switch responsive to rotation of said plate member.

3. In a tape transport mechanism of the type including a support, a pair of reel-supporting spindle elements rotatably mounted on said support and adapted to engage respective reels having the respective opposite end portions of a magnetic tape wound thereon and extending from one reel to the other, a magnetic transducer head mounted on the support, and guide means on the support arranged to guide the tape past said head, the improvement comprising a second support pivoted to said first support, a pair of drive capstans journaled on said second support adjacent the path of the tape, means driving said capstans in opposite directions of rotation, and a pair of electromagnetic devices connected to the second support and arranged to rotate said second support respectively in opposite directions to respectively engage the capstans with the tape responsive to energization of the respective electromagnetic devices.

4. In a tape transport mechanism of the type including a support, a pair of reel-supporting spindle elements rotatably mounted on said support and adapted to engage respective reels having the respective opposite end portions of a magnetic tape wound thereon and extending from one reel to the other, a magnetic transducer head mounted on the support, and guide means on the support arranged to guide the tape past the head, the improvement comprising a second support pivoted to said first support, a pair of drive capstans journaled on said second support adjacent the path of the tape, means driving said capstans in opposite directions of rotation, a pair of electromagnetic devices connected to the second support and arranged to rotate said second support respectively in opposite directions to respectively engage the capstans with the tape responsive to energization of the respective electromagnetic devices, and means for moving the transducer head vertically responsive to rotation of said second support.

5. In a tape transport mechanism of the type including a support, a pair of reel-supporting spindle elements rotatably mounted on said support and adapted to engage respective reels having the respective opposite end portions of a magnetic tape wound thereon and extending from one reel to the other, a magnetic transducer head mounted on the support, and guide means on the support arranged to guide the tape past said head, the improvement comprising a second support pivoted to said first support, a pair of drive capstans journaled on said second support adjacent the path of the tape, means driving said capstans in opposite directions of rotation, a pair of electromagnetic devices connected to the second support and arranged to rotate said second support respectively in opposite directions to respectively engage the capstans with the tape responsive to energization of the respective electromagnetic devices, and means for at times selectively energizing said electromagnetic devices responsive to rotation of said second support to predetermined positions in opposite directions.

6. In a tape transport mechanism of the type including a support, a pair of reel-supporting spindle elements rotatably mounted on said support and adapted to engage respective reels having the respective opposite end portions of a magnetic tape wound thereon and extending from one reel to the other, a magnetic transducer head mounted on the support, and guide means on the support arranged to guide the tape past said head, the improvement comprising a second support pivoted to said first support, a pair of drive capstans journaled on said second support adjacent the path of the tape, means driving said capstans in opposite directions of rotation, a pair of electromagnetic devices connected to the second support and arranged to rotate said second support respectively in opposite directions to respectively engage the capstans with the tape responsive to energization of the respective elctromagnetic devices, a normally open energizing circuit, means for selectively connecting said electromagnetic devices to said energizing circuit in accordance with the rotated position of the second support, and means for at times closing said energizing circuit momentarily to rotate said second support.

7. In a tape transport mechanism of the type including a support, a pair of reel-supporting spindle elements rotatably mounted on said support, respective reels on said spindle elements, a magnetic tape having its opposite end portions wound on the respective reels and extending from one reel to the other, a magnetic transducer head mounted on the support, and guide means on the support arranged to guide the tape past said head, the improvement comprising a second support pivoted to said first support, a pair of drive capstans journaled on said second support adjacent the path of the tape, means driving said capstans in opposite directions of rotation, a pair of electromagnetic devices connected to the second support and arranged to rotate said second support respectively in opposite directions to respectively engage the capstans with the tape responsive to energization of the respective electromagnetic devices, a normally open energizing circuit, means for selectively connecting said electromagnetic devices to said energizing circuit in accordance with the rotated position of the second support, and cooperating means on the tape and the first-named support for closing said energizing circuit momentarily to rotate said second support.

8. In a tape transport mechanism of the type including a support, a pair of reel-supporting spindle elements rotatably mounted on said support, respective reels on said spindle elements, a magnetic tape having its opposite end portions wound on the respective reels and extending from one reel to the other, a magnetic transducer head mounted on the support, and guide means on the support arranged to guide the tape past said head, the improvement comprising a second support pivoted to said first support, a pair of drive capstans journaled on said second support adjacent the path of the tape, means driving said capstans in opposite directions of rotation, a pair of electromagnetic devices connected to the second support and arranged to rotate said second support respectively in opposite directions to respectively engage the capstans with the tape responsive to energization of the respective electromagnetic devices, a normally open energizing circuit, means for selectively connecting said electromagnetic devices to said energizing circuit in accordance with the rotated position of the second support, abutment means on the tape, and normally open switch means on the support engageable by said abutment means and connected in said energizing circuit for closing said energizing circuit momentarily to rotate said second support.

9. In a tape transport mechanism of the type including a support, a pair of reel-supporting spindle elements rotatably mounted on said support, respective reels on said spindle elements, a magnetic tape having its opposite end portions wound on the respective reels and extending from one reel to the other, a magnetic transducer head mounted on the support, and guide means on the support arranged to guide the tape past said head, the improvement comprising a second support pivoted to said first support, a pair of drive capstans journaled on said second support adjacent the path of the tape, means driving said capstans in opposite directions of rotation, a pair of electromagnetic devices connected to the second support and arranged to rotate said second support respectively in opposite directions to respectively engage the capstans with the tape responsive to energization of the respective electromagnetic devices, a normally open energizing circuit, means for selectively connecting said electromagnetic devices to said energizing circuit in accordance with the rotated position of the second support, abutment means on the tape, normally open switch means on the support engageable by said abutment means and connected in said energizing circuit for closing said energizing circuit momentarily to rotate said second support, and means for opening said energizing circuit for a predetermined time period responsive to each rotation of said second support.

10. In a tape transport mechanism of the type including a support, a pair of reel-supporting spindle elements rotatably mounted on said support and adapted to engage respective reels having the respective opposite end portions of a magnetic tape wound thereon and extending from one reel to the other, a magnetic transducer head mounted on the support, and guide means on the support arranged to guide the tape past said head, the improvement comprising a second support pivoted to said first support, a pair of drive capstans journaled on said second support adjacent the path of the tape, means driving said capstans in opposite directions of rotation, a pair of electromagnetic devices connected to the second support and arranged to rotate said second support respectively in opposite directions to respectively engage engage the capstans with the tape responsive to energization of the respective electromagnetic devices, an electric motor, means drivingly coupling said motor to the capstans and arranged to drive said capstans in opposite directions, means drivingly coupling said motor to said spindle elements and arranged to rotate said spindle elements synchronously in one direction or in the opposite direction in accordance with the rotated position of said second support, a source of current, circuit means connecting said source of current to said motor, a current regulating rheostat connected in said circuit means, and means adjusting said rheostat in accordance with the potential of said current source.

11. In a tape transport mechanism, a supoprt, a pair of spindle elements coaxially and rotatably mounted on said support, one above the other, a first reel detachably secured on one spindle element, an adapter ring on the other spindle element above the first reel, a second reel, identical to said first reel detachably secured on said adapter ring, said reels being adapted to receive the opposite end portions of a magnetic tape wound on the respective reels and extending from one reel to the other, guide means on the support arranged to guide the tape, a second support pivoted to said first support, a pair of drive capstans journaled on said second support adjacent the path of the tape, means driving said capstans in opposite directions of rotation, and a pair of electromagnetic devices connected to the second support and arranged to rotate said second support respectively in opposite directions to respectively engage the capstans with the tape responsive to energization of the respective electromagnetic devices.

References Cited in the file of this patent

UNITED STATES PATENTS

| | | |
|---|---|---|
| 2,335,277 | Heller | Nov. 30, 1943 |
| 2,349,018 | Tasker | May 16, 1944 |
| 2,495,125 | Nemeth | Jan. 17, 1950 |
| 2,524,064 | Masterson et al. | Oct. 3, 1950 |
| 2,563,545 | Moreland et al. | Aug. 7, 1951 |
| 2,668,674 | Roberts | Feb. 9, 1954 |